350-96.24 SR

XR 3,947,844

United St[illegible] [11] 3,947,844

Miyoshi [45] Mar. 30, 1976

[54] APPARATUS FOR GENERATING SIGNALS CORRESPONDING TO CHARACTERS TO BE DISPLAYED

[75] Inventor: Hitoshi Miyoshi, Asaka, Japan

[73] Assignee: Fuji Photo Film Co., Ltd., Kanagawa, Japan

[22] Filed: July 24, 1974

[21] Appl. No.: 491,503

[30] Foreign Application Priority Data

July 26, 1973 Japan ................................ 48-84440

[52] U.S. Cl. ............ 340/380; 250/213 A; 250/553; 250/555

[51] Int. Cl.² ............................................ G06F 3/14

[58] Field of Search .... 340/324 A, 324 AD, 324 M, 340/380; 250/213 A

[56] References Cited

UNITED STATES PATENTS

| | | | |
|---|---|---|---|
| 3,514,616 | 5/1970 | Kolb | 340/324 AD |
| 3,518,657 | 6/1970 | Zinn et al. | 340/324 AD |
| 3,689,910 | 9/1972 | Glaser | 340/324 M |

*Primary Examiner*—Marshall M. Curtis
*Attorney, Agent, or Firm*—Fleit & Jacobson

[57] ABSTRACT

A character board carrying a number of characters is placed in face-to-face relationship with a light source matrix comprising light sources of the same number as that of the characters so that one character may be illuminated by one light source. Each character is divided into a predetermined number of sections or dots. A photodetector matrix comprising photodetectors of the same number as that of the sections into which the character is divided is provided in connection with the character board. Optical fibers of the same number as that of the sections are provided for each character to transmit the light passing through the character to the photodetectors of the photodetector matrix. The corresponding sections of the respective characters are connected with the same photodetector by means of optical fibers so that every photodetector may receive signals from the sections in the same position of the different characters. The photodetectors are connected with a scanning line selecting circuit by way of amplifiers. In accordance with the output of the character generator as constructed above, characters are displayed in a display such as a cathode ray tube.

4 Claims, 5 Drawing Figures

3947844
OR IN 340/380

APPARATUS FOR GENERATING SIGNALS CORRESPONDING TO CHARACTERS TO BE DISPLAYED

BACKGROUND OF THE INVENTION

1. Field of the Invention

This invention relates to a character generator, and more particularly to a device for generating signals for indicating characters in a display using for instance a cathode ray tube, light emitting diodes or electric lamps.

2. Description of the Prior Art

It is already known that a read-only memory, a monoscope tube and a vidicon can be used as a character generator in a display using character displaying means such as a cathode ray tube, light emitting diodes or electric lamps. However, these character generators of conventional type have drawbacks as described hereinbelow. The read-only memory which is in the form of an integrated circuit and the monoscope tube are disadvantageous in that the kind and form of the characters displayed cannot be easily changed since the kind and form of the characters handled thereby are particularly predetermined when they are manufactured. Further, since the monoscope is a kind of cathode ray tube, it has a large size and needs a high voltage for operation. The vidicon which takes an image of a photographic film bearing characters to be displayed is advantageous in that the kind and form of the characters can easily be changed by changing the film, but is disadvantageous in that it has a large size and needs a high voltage for operation since it is also a kind of cathode ray tube.

SUMMARY OF THE INVENTION

In the light of the foregoing observations and description of the conventional character generators, the primary object of the present invention is to provide a character generator which can be operated with a comparatively low voltage.

Another object of the present invention is to provide a character generator in which the kind and form of characters can easily be changed.

Still another object of the present invention is to provide a character generator which is compact in size.

The character generator in accordance with the present invention employs a changeable character board which carries a number of characters to be displayed. A light source matrix comprised of a number of light sources of the same number as that of the characters carried on the character board is provided in face-to-face relationship with the character board so that only one character may be illuminated by only one light source. The character is divided into a number of dots or sections and optical fibers of the same number as that of the dots are provided in front of each character with one end thereof faced to each dot or section of the characters. The other end of the optical fibers are connected with photodetectors of a photodetector matrix comprised of photodetectors of the same number as that of the dots or sections into which the character is divided. The optical fibers one end of which is located at the corresponding part or dot of the characters are all connected with the same photodetector in the photodetector matrix. The photodetector matrix is connected with an amplifier matrix, which in turn is connected with a scanning line selecting circuit.

Since the character board employed in the character generator in accordance with the present invention can easily be changed, the character generator of this invention is particularly suitable for a display in which the kind or form of characters is frequently desired to be changed.

PREFERRED EMBODIMENTS OF THE INVENTION

The character generator in accordance with an embodiment of the present invention will now be described in detail with reference to an example in which the character generator is employed in connection with a television display to display characters on a cathode ray tube. In this embodiment, 160 characters are displayed on the cathode ray tube in which sixteen characters are arranged in the direction of the scanning lines and 10 lines of characters are arranged in the direction perpendicular to the scanning lines. Each character is comprised of a dot matrix of 12×12=144 dots and adjacent characters are spaced from each other by the space corresponding to four dots.

Figure 1:
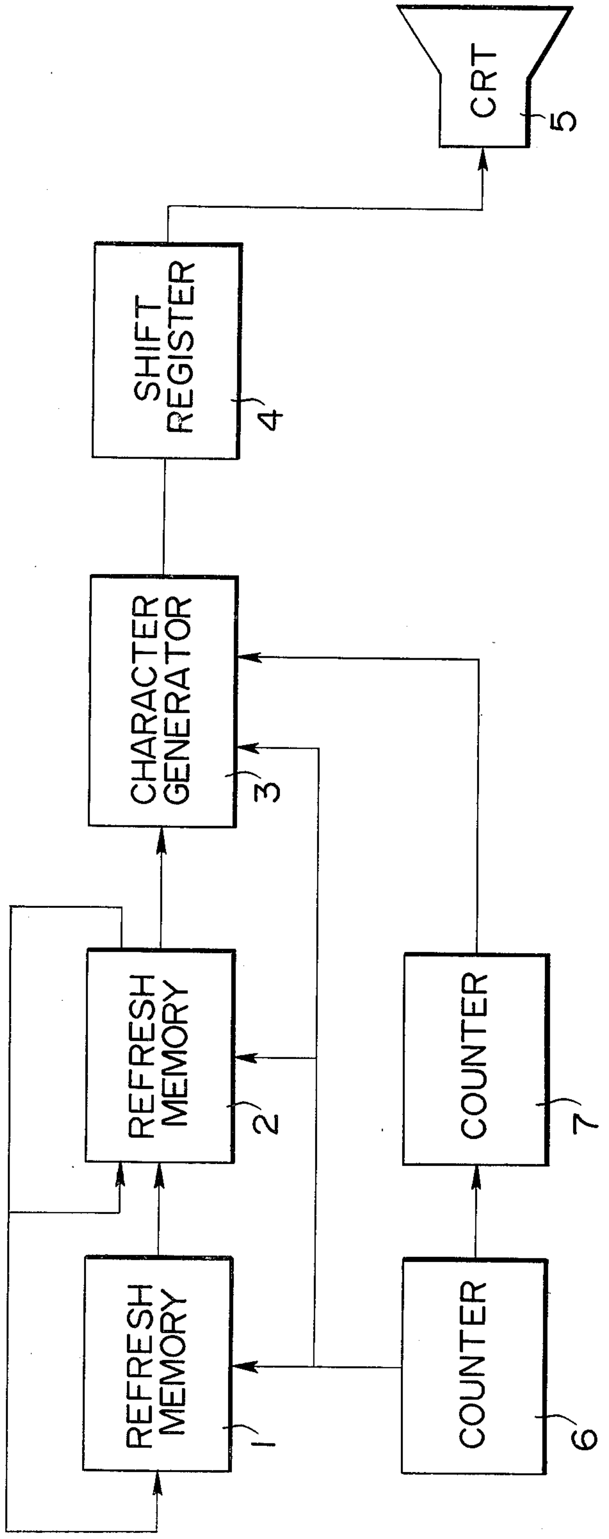
FIG. 1 is a block diagram showing a control circuit which includes a character generator and operates a display to display characters in accordance with the output from the character generator.

Referring to FIG. 1 which shows in a block diagram a control circuit including a character generator 3 for operating a cathode ray tube 5, two refresh memories 1 and 2 are connected with the character generator 3. The second refresh memory 2 has a capacity of one line of characters, i.e., 16 characters, and the first refresh memory 1 has a capacity corresponding to the characters displayed at once on the cathode ray tube minus one line of characters, i.e., 144 characters. As for the refresh memory, a shift register, a magnetostrictive delay line memory, a random access memory and the like can be used as well known in the art. In this embodiment, shift registers are used for the refresh memories 1 and 2. A 12-bit shift register 4 is connected with the character generator 3 to receive parallel output signals of 12 bits from the character generator 3. The output of the shift register 4 is transmitted to the cathode or grid of the cathode ray tube 5. A first counter 6 which controls the position of the light spot scanning on the face plate of the cathode ray tube 5 is connected with the refresh memories 1 and 2 and the character generator 3 to control the recirculation of the refresh memories 1 and 2. A second counter 7 which selects the scanning line to be displayed is connected with the first counter 6. The units of the system of counting of the second counter 7 are powers of sixteen. (The decimal system is a counting system the units of which are powers of ten.)

Figure 2:
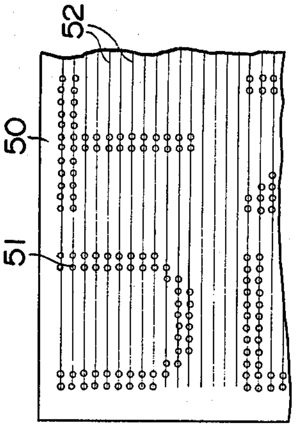
FIG. 2 is a partial front view showing the face plate of a cathode ray tube on which characters are displayed.

The characters are displayed on the face plate 50 of the cathode ray tube 5 as shown in FIG. 2, in which characters "U" and "T" are indicated with brightening spots 51 at the selected positions corresponding to the positions of the dots on scanning lines 52.

Figure 3:
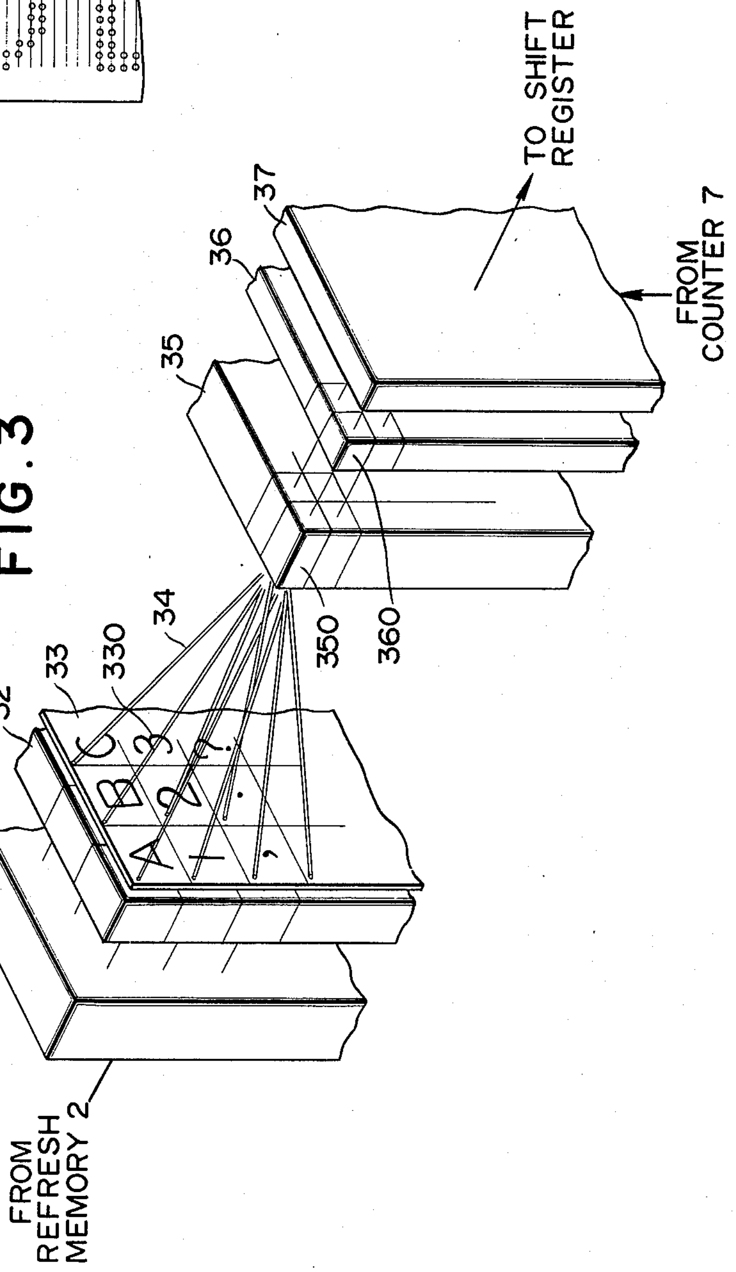
FIG. 3 is a perspective view of the character generator in accordance with the present invention.

The character generator in accordance with the present invention is illustrated in detail in FIG. 3 together with accompanying circuits. Referring to FIG. 3, a character codde decoder 31 which is connected with said second refresh memory 2 is connected with a light souce matrix 32 comprising a number of light sources such as light emitting diodes or flash lamps, so that the output of the character decoder 31 may be transmitted to the light source matrix 32 to selectively energize the light sources.

A character board 33 bearing a number of characters 330 is located in front of and close to the light source matrix 32 so that the respective characters 330 may be located immediately in front of the respective light sources and only one character 330 may be illuminated with the light from one light source in the light source matrix 32. As for the character board 33, can be used for instance a photographic film on which characters such as alphabets, numerals and symbols are recorded as well known in the art. Each character 330 recorded on the character board 33 is divided into 144 (12×12) dots or sections. Every character 330 is provided with 144 optical fibers 34 one end of which is in front of and close to each dot of the character. The other end of the 144 optical fibers 34 is close to or connected with each photodetector 350 of a photodetector matrix 35 comprising 144 photodetectors. The 144 photodetectors correspond to the 144 dots of the characters and one photodetector 350 is provided with the optical fibers of the same number as that of the characters carried on the character board 33. Further, one end of the optical fibers 34 the other end of which is connected with a photodetector 350 is located at the corresponding section or dot of the characters 330 of the character board 33. For instance, optical fibers 34 one end of which is connected with the left top part or dot of the respective characters 330 are connected with the left top photodetector 350 of the photodetector matrix 35.

Figure 4:
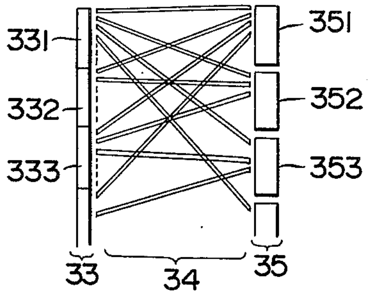
FIG. 4 is an enlarged partial side view showing the construction of a part of the character generator including a character board, light transmitting fibers, and a photodetector matrix.

The connection between the characters 330 and the photodetectors 350 made by means of the optical fibers 34 is illustrated in more detail in FIG. 4. The character board 33 carries characteers 331, 332, 333 . . ., and the photodetector matrix 35 includes photodetectors 351, 352, 353 . . ., and the characters and the photodetectors are connected with each other by way of optical fibers 34. The uppermost dots in the left end line of dots in the respective characters 331, 332, 333 are connected with the left end uppermost photodetector 351. The dots next to the uppermost dots in the respective characters 331, 332, 333 are connected with the photodetector 352 which is next to the uppermost photodetector 351. The third dots from the upper end of the respective characters 331, 332, 333 are connected with the third photodetector 353 as shown in FIG. 4. Thus, all the 144 dots of the respective characters on the character board 33 are connected with the 144 photodetector matrix 35.

As for the photodetectors 350, various kinds of photoresponsive elements such as photodiodes or photocells can be used. The photodetector matrix 35 is connected with an amplifier matrix 36 comprising 144 amplifiers which are connected with the respective photodetectors 350. The output of the photodetectors 350 is amplifiers 360 and converted to binary signals, "0" or "1." The amplifier matrix 36 is connected with a scanning line selecting circuit 37. The scanning line selecting circuit 37 detects on which scanning line the cathode ray tube is scanning and picks up signals of 12 dots of the character to be indicated on the detected scanning line, and sends the signal of 12 bits to the shift register 14.

Figure 5:
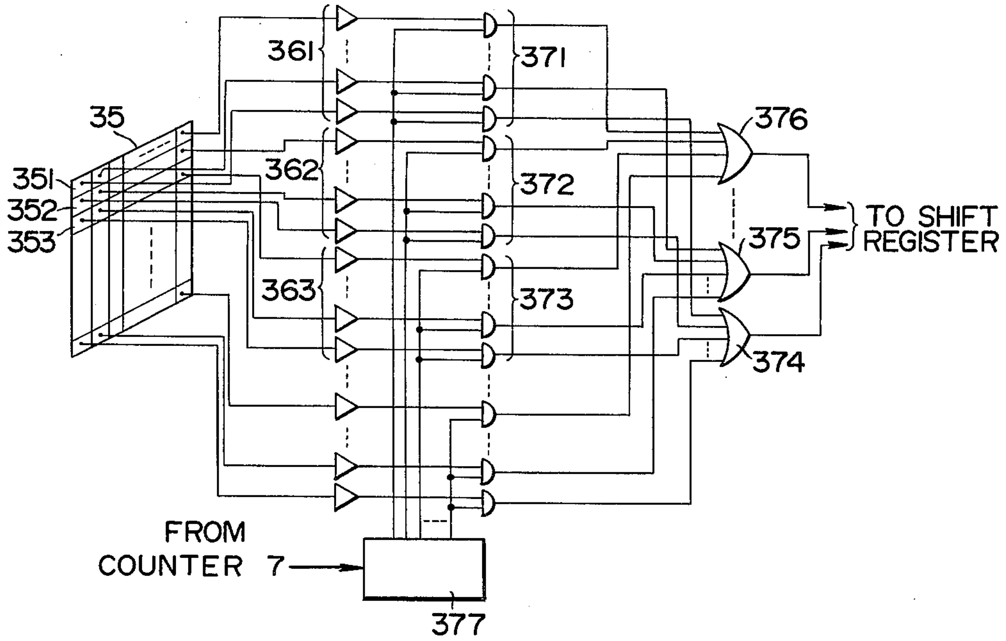
FIG. 5 is a circuit view showing the electrical connection between the photodetector matrix and a scanning line selecting circuit employed in the character generator in accordance with the present invention.

The connection between the above described photodetector matrix 35, amplifier matrix 36 and scanning line selecting circuit 37 is illustrated in greater detail in FIG. 5. In FIG. 5, a part of the amplifier matrix 36 comprising 144 amplifiers is shown with several groups of amplifiers 361, 362 and 363. The uppermost group of amplifiers 361 is composed of twelve amplifiers which are connected with the photodetectors in the uppermost line of the photodetector matrix 35 including said left end uppermost photodetector 351. The second group of amplifiers 362 illustrated next to said uppermost group of amplifiers 361 in FIG. 5 is composed of 12 amplifiers which are connected with the photodetectors in the second line of the photodetector matrix 35 including said second photodetector 352. Similarly, the third group of amplifiers 363 is composed of 12 amplifiers connected with the photodetectors in the third line of the photodetector matrix 35 including said third photodetecctor 353. In every group of the amplifiers, one amplifier is connected with one photodetector. A part of the scanning line selecting circuit 37 is illustrated with several groups of AND gates 371, 372, 373 . . . and OR gates 374, 375, 376 and a decoder 377. The decoder 377 receives 4-bit signals from the second counter 7 and generates signals corresponding to 0 to 11 of the signals of counting system the units of which are power of 16. The 12 signals corresponding to the signals of 0 to 11 are transmitted through 12 signal lines. The first AND gate group 371 is composed of 12 AND gates which generate a logical product of the output of the first amplifier group 361 and the output signal from the decoder 377 corresponding to the signal 0 of said 12 signals 0 to 11. The second AND gate group 372 is composed of 12 AND gates which generate a logical product of the output of the second amplifier group 362 and the output signal from the decoder 377 corresponding to the signal 1 of said 12 signals 0 to 11. Similarly the third AND gate group 373 composed of 12 AND gates makes a logical product of the output of the third amplifier group 363 and the signal from the decoder 377 corresponding to the signal 2 of said 12 signals 0 to 11. Similarly, the other AND gate groups make logical products of the output of the amplifiers in the fourth to twelfth lines of the amplifier matrix 35 and the output signals of the decoder 377 corresponding to the signals 3 to 11 of the counting system the units of which are powers of 16.

The OR gate 374 makes a logical sum of the AND outputs of the twelve amplifiers connected with the 12 photodetectors in the first row of all of the lines of photodetectors in the photodetector matrix 35 as shown in FIG. 5. The OR gate 375 makes a logical sum of the AND outputs of the 12 amplifiers connected with the 12 photodetectors in the second row of all the lines of photodetectors in the photodetector matrix 35. Similarly, the OR gate 376 makes a logical sum of the AND outputs of the 12 amplifiers connected with the 12 photodetectors in the 12th row of all the lines of photodetectors in the photodetector matrix 35. Quite similarly, OR gates between the second OR gate 375 and the twelfth or the last OR gate 376 make logical sums of the AND outputs of the 12 amplifiers connected with the 12 photoconductors in the third to eleventh rows of all the lines of photodetectors in the photodetector matrix 35. The output of the OR gate 374 is put into the first place of the shift register 4, the output of the OR gate 375 is put into the second place of the shift register 4, and the output of the OR gate 376 is put into the last place of the shift register 4. Similarly, the outputs of the OR gates between the second OR gate 375 and the last OR gate 376 are put into the third to eleventh places of the shift register 4.

The operation of the above described embodiment of the invention will be described in detail hereinbelow. If the clock frequency is selected to be 6024 KHz, one light spot brightens on the face plate 50 of the cathode ray tube 5 for a period of 166ns. Since the horizontal length of one character corresponds to twelve spots for indicating the character plus four spots for the space between characters, the time for scanning one character is about 2.66$\mu s$ which corresponds to sixteen spots.

Now assuming that character codes corresponding to two characters, "U" and "T" are stored in the second refresh memory 2 and the first scanning line on the cathode ray tube 5 is on the point of being scanned, the output of the second refresh memory 2 is decoded by the character code decoder 31 and only one light source in the light source matrix 32 is energized to illuminate only the character of "U" among the number of characters recorded on the character board 33. The pattern of the character "U" is transmitted through the light transmitting optical fibers 34 to the photodetector matrix 35 consisting of 144 photodetectors, and the amount of light transmitted to the photodetectors of the photodetector matrix 35 is amplified through the amplifiers of the amplifier matrix 36 and represented by the output of "0" or "1" thereby.

Since the first scanning line is on the point of being scanned now, only the signal corresponding to the signal 0 of the signals of the counting system having the units which are powers of 16 among the outputs of the decoder 377 is in the state of "1" of the binary signal, and the other 11 signals are in the state of "0". Therefore, only the output of the amplifier group 361 passes through the AND gate group 371 and is put into the OR gates 374, 375 and 376. The output of the amplifier groups connected with the photodetectors in the second to twelfth lines of the photodetector matrix 35 is blocked by the other AND gates 372, 373 . . . which are partly shown in the drawing. Therefore, in the first to twelfth places of the shift register 4 are set binary signals of 110000000011 which indicate a part of the character of "U" in the first scanning line. The signals set in the shift register 4 are shifted by the clock signals of the frequency of 6024 KHz and 12 spots are indicated on the first scanning line from left to right as bright, bright, dark, dark, dark, dark, dark, dark, dark, dark, bright, bright. The succeeding four spots corresponding to the space between the adjacent characters are automatically made dark by the operation of the first counter 6. During the period for indicating the four spots, i.e., 664ns, the signals from the second refresh memory 2 are shifted by one character and the output signals from the second refresh memory 2 is switched from the character "U" to the character "T." Similarly to the character illuminating step in the above described process to generate the signals for displaying the character of "U," only the character of "T" on the character board 33 is illuminated by a light source. Further, since only the signal corresponding to the signal 0 of the counting system having units which are powers of 16 is in the state of "1" of the binary signal, the shift register 4 is set to have binary signals of 111111111111 which indicate a part of the character of "T" in the first scanning line When the seventeenth spot on the first scanning line is indicated on the cathode ray tube, the signals from the shift register 4 is shifted by the clock signal of frequency of 6024 KHz and the next character starts to be displayed. Similarly, the shift of the signals from the shift register 4 is repeated sixteen times for indicating sixteen characters on the cathode ray tube 5. When the 16 characters are indicated in the first scanning line on the cathode ray tube, the output of the shift register 4 is again changed to that of the character of "U." The repetition of the signal shift of the refresh memory is conducted by the frequency of 15.75 KHz. Therefore, it takes about 42.6$\mu s$ to display sixteen characters on the cathode ray tube. The time corresponding to the difference between the period for scanning the sixteen characters in a scanning line and the period for scanning one scanning line, i.e., 63.5$\mu s$ (15.75 KHz) $-$ 42.6$\mu s$ = 20.9$\mu s$, is used for the fly-back of the scanning line and for indicating the dark marginal part on the face plate of the cathode ray tube 5.

Then, when the second scanning line becomes to be displayed in the cathode ray tube 5, only the first character "U" is illuminated with light and the output of the decoder 377 comes to a state wherein only the signal line of the signal "1" of the counting system having the units which are powers of 16 becomes to be in the state of "1" of the binary signal. Therefore, spots on the second scanning line indicating a part of the character "U" are indicated on the cathode ray tube. In this case, only the output of the second amplifier group 362 corresponding to the photodetectors in the second line of the photodetector matrix 35 is put into the shift register 4, and the shift register 4 is set to have the signals of 110000000011 for the second scanning line of the cathode ray tube to display the character of "U." Thus, spots on the twelve scanning lines are all indicated in the cathode ray tube to indicate the whole view of the sixteen characters in the first line of characters.

After the signals in the second refresh memory 2 are recirculated therein 12 times, the character codes of the next 16 characters are shifted from the output-side of the first refresh memory 1 to the input-side of the second refresh memory 2 while the thirteenth to sixteenth scanning lines are scanned on the cathode ray tube 5. Simultaneously, the signals in the second refresh memory 2 are shifted into the first refresh memory 1 from the input-side thereof. Therefore, at the time when the shift operation is finished, a character code of the character located just under the character "U" among the 16 characters to be displayed by the seventeenth scanning line comes to the output-side of the second refresh memory 2. By repeating the foregoing operations, 160 characters are all displayed on the cathode ray tube 5.

It will be noted that the number of the dots constituting the characters, the number of the photodetectors and the number of characters displayed on the cathode ray tube are not limited to those indicated in the above described embodiment of the invention, but may be properly selected in accordance with the use of the display. Further, the direction of the scanning lines may not be horizontal, but may be vertical. It will further be noted that the character generator in accordance with the present invention can be used for displaying characters not only in the cathode ray tube but also in a printing device and in various other types of display means such as a display employing light emitting diodes or electric lamps.

I claim:

1. Apparatus for generating signals corresponding to characters to be displayed comprising, in combination, a changeable character board provided with a plurality of characters to be displayed, each of said characters being divided into a plurality of sections, a light source matrix comprising a plurality of light sources corresponding in number and position to said plurality of characters disposed adjacent said character board, each of said light sources being associated with one of said characters for illuminating said associates character only, means for selectively energizing each of said light sources, a photodetector matrix comprising a plurality of photodetectors corresponding in number to the plurality of sections in each of said characters, a plurality of light transmitting fibers corresponding in number to the plurality of sections in each of said characters disposed between said character board and said photodetector matrix, said fibers having one end associated with a section of said characters and the other end with one of said photodetectors for transmitting light signals between said character board and said photodetector matrix, said fibers being arranged in associated groups to interconnect in light transmitting relationship all of the corresponding sections throughout said plurality of characters to one of said plurality of photodetectors, whereby all of the sections in each of said characters are optically connected to all of said photodetectors, character display means, and means for detecting the output of said photodetectors in response to the selective illumination of said characters on said character board to generate signals for displaying said character on said display means.

2. Apparatus in accordance with claim 1 wherein said character board comprises a photographic film containing said characterss.

3. Apparatus in accordance with claim 1 wherein said light sources comprise light emitting diodes arranged in a planar configuration.

4. Apparatus in accordance with claim 1 wherein said photodetectors comprise photodiodes arranged in a planar configuration.

* * * * *